United States Patent [19]

Veenhof

[11] Patent Number: 5,797,477

[45] Date of Patent: Aug. 25, 1998

[54] CONVEYOR BELT SCRAPER BLADE

[75] Inventor: Willem D. Veenhof, Brevard, N.C.

[73] Assignee: Martin Engineering Company, Neponset, Ill.

[21] Appl. No.: 764,122

[22] Filed: Dec. 12, 1996

Related U.S. Application Data

[63] Continuation-in-part of Ser. No. 430,394, Apr. 28, 1995, Pat. No. 5,647,476, which is a continuation-in-part of Ser. No. 269,568, Jul. 1, 1994, Pat. No. 5,413,208.

[51] Int. Cl.⁶ ............................................. B65G 45/00
[52] U.S. Cl. ........................... 198/499; 198/497; 15/256.5
[58] Field of Search ............................. 198/497, 499; 15/256.5

[56] References Cited

U.S. PATENT DOCUMENTS

| | | | |
|---|---|---|---|
| 4,533,036 | 8/1985 | Gordon . | |
| 4,633,999 | 1/1987 | Perneczky | 198/499 |
| 4,643,293 | 2/1987 | Swinderman . | |
| 4,658,949 | 4/1987 | Reicks . | |
| 4,787,500 | 11/1988 | Holz . | |
| 4,850,474 | 7/1989 | Schwarze | 198/499 |
| 4,917,231 | 4/1990 | Swinderman . | |
| 4,953,689 | 9/1990 | Peterson et al. | 198/497 |
| 5,197,587 | 3/1993 | Malmberg . | |
| 5,222,588 | 6/1993 | Gordon . | |
| 5,222,589 | 6/1993 | Gordon . | |
| 5,301,797 | 4/1994 | Hollyfield, Jr. et al. | 198/499 |
| 5,310,042 | 5/1994 | Veenhof . | |
| 5,339,947 | 8/1994 | Campanile | 198/499 |
| 5,372,244 | 12/1994 | Morin | 198/499 |
| 5,373,931 | 12/1994 | Barnes . | |
| 5,413,208 | 5/1995 | Veenhof | 198/497 |
| 5,518,107 | 5/1996 | Schwarze | 198/499 |
| 5,647,476 | 7/1997 | Veenhof | 198/499 |

FOREIGN PATENT DOCUMENTS

| | | |
|---|---|---|
| 1433912 | 2/1966 | France . |
| 1234-315-A | 5/1986 | U.S.S.R. . |
| 2 267 072 | 11/1993 | United Kingdom . |

*Primary Examiner*—Karen M. Young
*Assistant Examiner*—Douglas Hess
*Attorney, Agent, or Firm*—Lee, Mann, Smith, McWilliams, Sweeney & Ohlson

[57] ABSTRACT

A conveyor belt scraper blade arrangement adapted for use in cleaning the surface of a conveyor belt. The scraper blade includes a mounting base having a first mounting member and a second mounting member. A scraping member having a mounting member and a scraping edge is removably attached to the mounting base by a restraining arm member and a spaced apart support arm member. The support arm member includes a first end that is removably attached to the first mounting member of the mounting base and a second end that is removably attached to the mounting member of the scraping member. The restraining arm member includes a first end that is removably attached to the second mounting member of the mounting base and a second end that is attached to the scraping member. The support arm member is selectively removable and replaceable from the scraper blade. The restraining arm member substantially prevents movement of the scraping edge in a direction away from the mounting base to control the amplitude of vibration of the scraper blade during use.

44 Claims, 7 Drawing Sheets

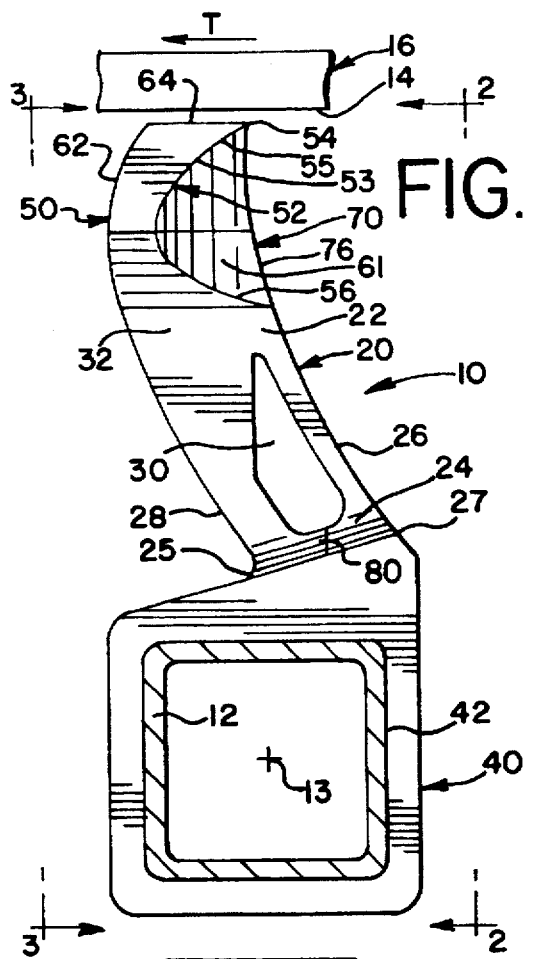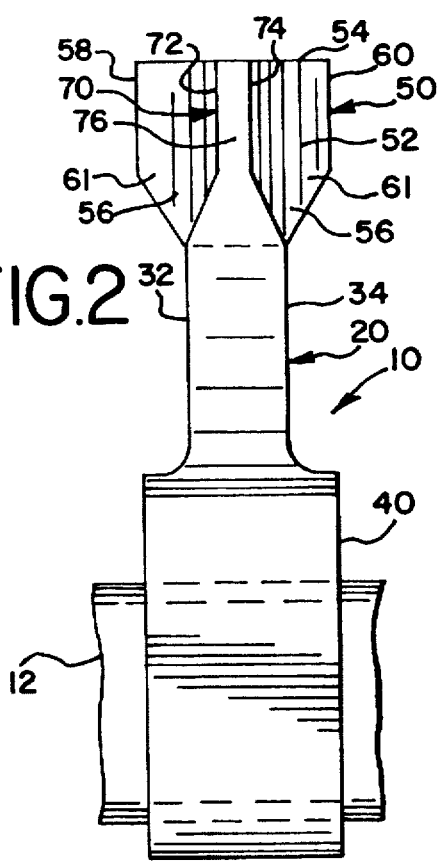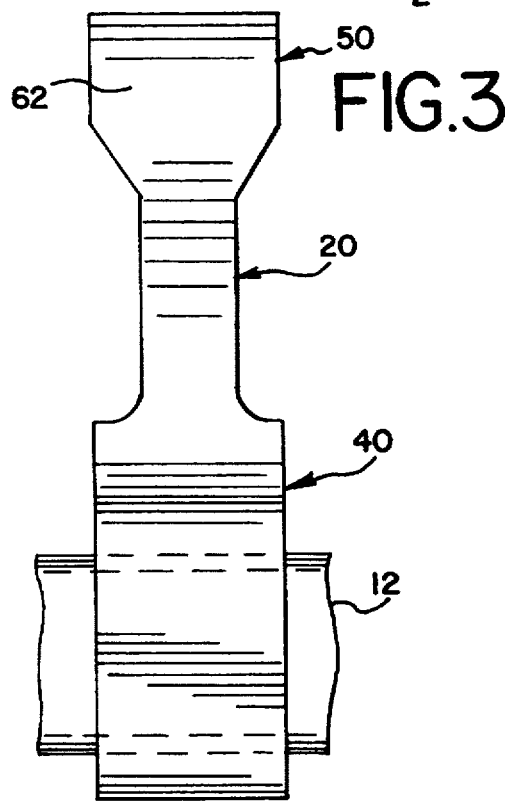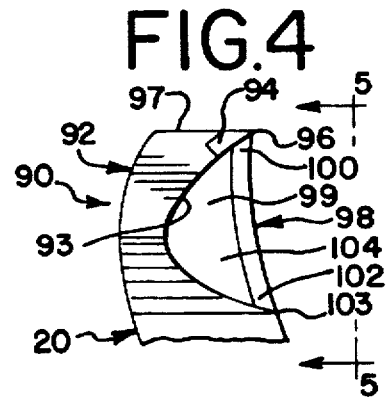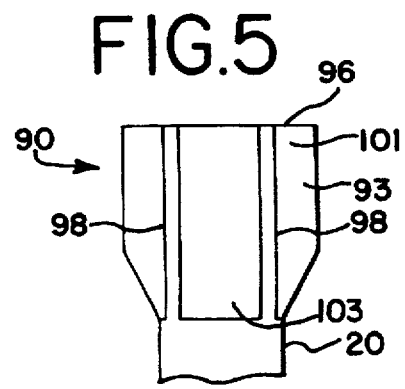

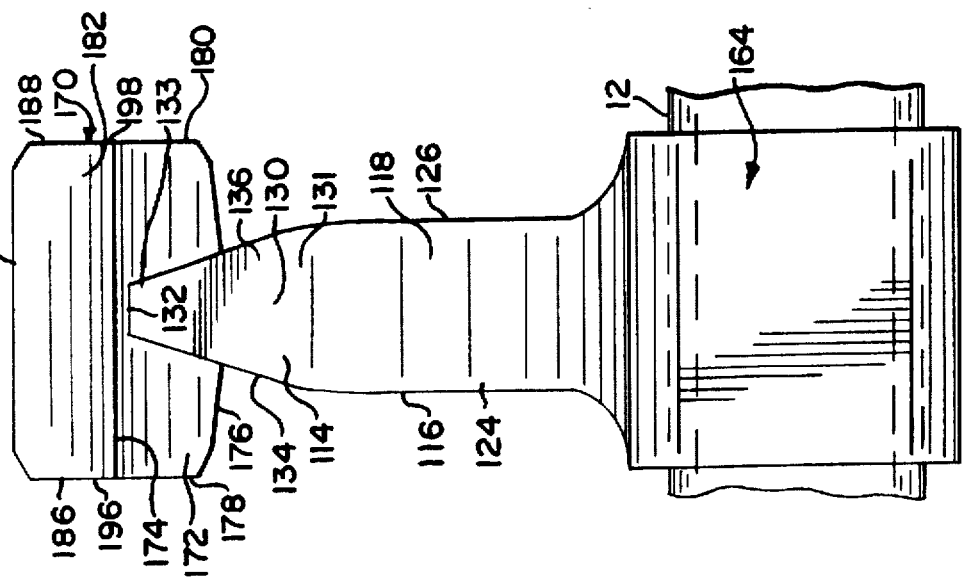
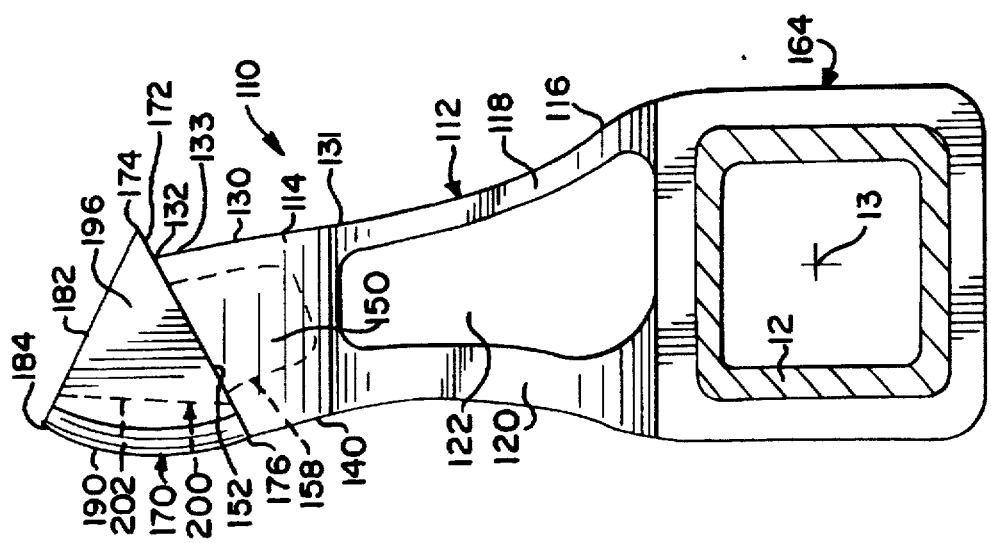
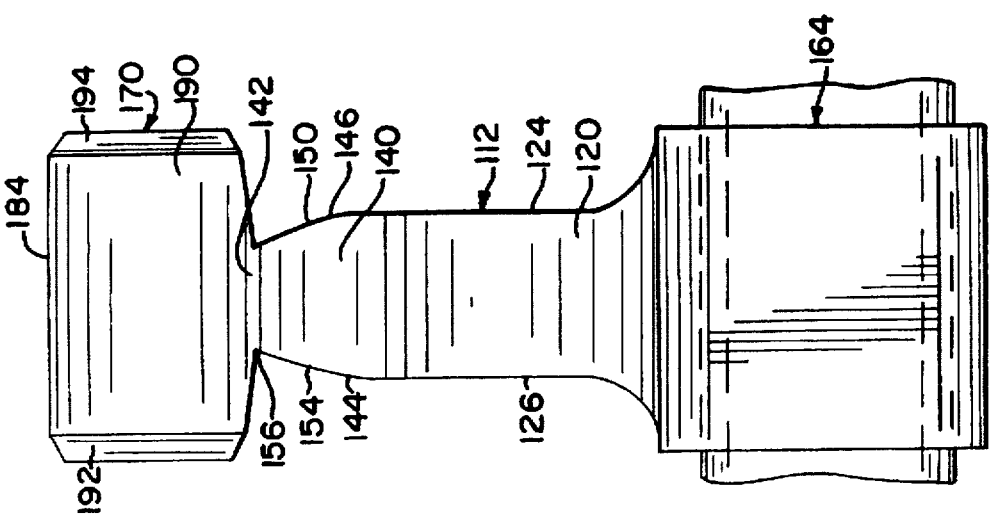

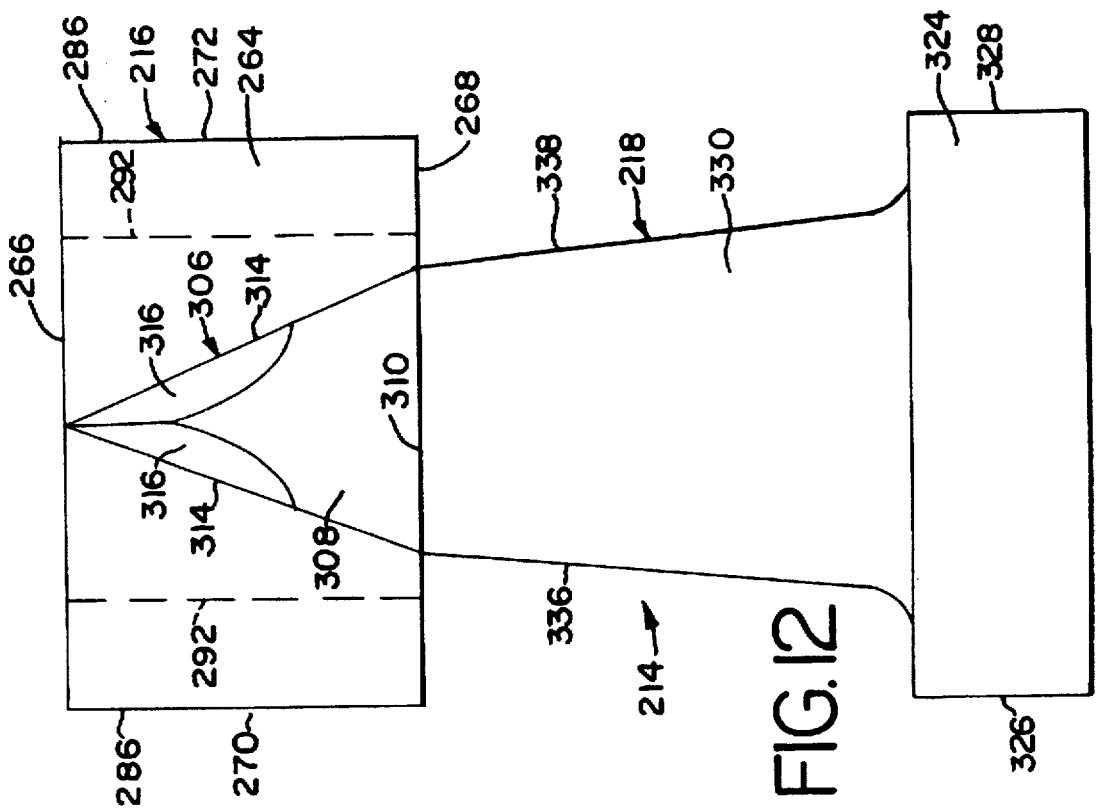
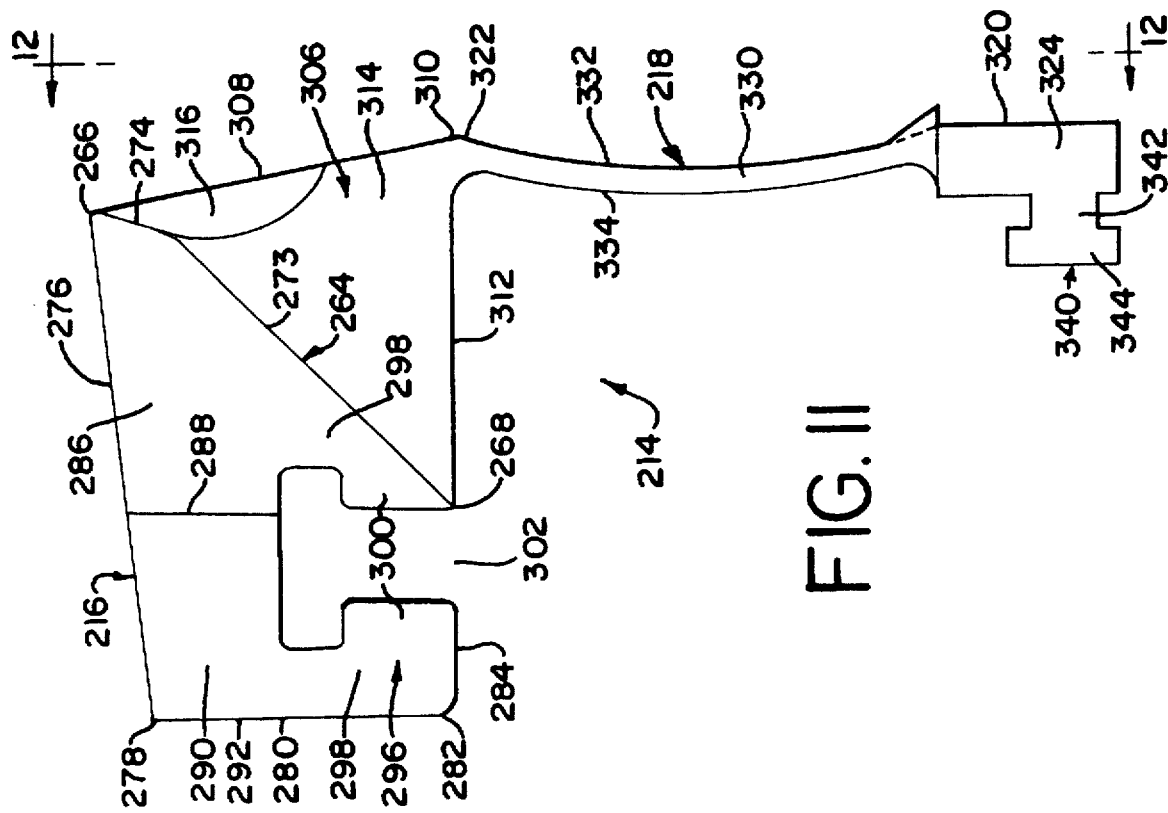
FIG. 12
FIG. 11

CONVEYOR BELT SCRAPER BLADE

RELATED APPLICATIONS

This is a continuation-in-part of U.S. patent application Ser. No. 08/430,394, filed Apr. 28, 1995, now U.S. Pat. No. 5,647,476 issued Jul. 15, 1997, which is a continuation-in-part of U.S. patent application Ser. No. 08/269,568, filed Jul. 1, 1994, now U.S. Pat. No. 5,413,208, issued May 9, 1995.

BACKGROUND OF THE INVENTION

The present invention is directed to a scraper blade for use in a conveyor belt cleaner mechanism for the removal of adherent material from a conveyor belt, and in particular, to a scraper blade which includes a structure adapted to control or eliminate the amplitude of vibration of the scraper blade during use when the face of the blade is located at a right angle or an obtuse cleaning angle relative to the conveyor belt.

Scraper blades are used in conveyor belt cleaning mechanisms to remove material which adheres to the belt surface after the material has passed the material discharge point of the conveyor. The cleaning angle of a scraper blade, which is the angle between the surface of the conveyor belt and the face of the scraper blade which faces the oncoming belt, may be an acute angle of less than 90°, a right angle of 90°, or an obtuse angle of greater than 90°. As used hereinafter, "obtuse angle" shall include a right angle of 90°.

Scraper blades that operate at an acute cleaning angle tend to trap material between the belt surface and the scraper blade as the direction of movement of the adherent material must change by greater than 90° during removal. A scraper blade operating at an acute cleaning angle may also separate from the belt surface due to an accumulation of trapped material between the blade and the conveyor belt, a condition known as "planing."

A scraper blade that operates at an obtuse cleaning angle is more efficient in removing adherent material from the belt as adherent material does not become trapped between the blade and the belt and as adherent material can be removed with a smaller change in the direction of travel of the adherent material than with a scraper blade having an acute cleaning angle.

While an obtuse cleaning angle is preferable over an acute cleaning angle, and a resiliently mounted blade is preferable to a rigidly mounted blade, resiliently mounted scraper blades having an obtuse cleaning angle are subject to destructive and cleaning efficiency reducing vibration at the scraping edge of the scraper blade. When a scraper blade is engaged against the belt surface, a rotational moment is created in the scraper blade by the drag of the belt over the edge of the scraper blade. When pressed against a conveyor belt, with a predetermined force to generate a predetermined cleaning pressure, a resiliently mounted scraper blade having an acute cleaning angle will rotate in a direction away from the belt surface, thus reducing the drag force created by the belt. This results in a comparatively small rotation and consequently only a small change in orientation from the scraper blade's natural orientation, thus producing a relatively stable and constant relationship between the blade and the belt surface with little or no resulting scraper blade vibration.

A resiliently mounted scraper blade having an obtuse cleaning angle, and applied against the belt with the same predetermined cleaning pressure will rotate in a direction toward the belt surface, causing a reaction in the blade supporting mechanism which moves in a direction away from the belt surface thereby reducing the drag force, which immediately causes the resiliently mounted blade to snap back to its natural orientation allowing the blade support mechanism to rotate towards the belt surface and resume the predetermined cleaning pressure which causes the same cycle of action and reaction to begin all over again. This unstable fluctuating relationship between the blade and the belt surface is seen as vibration of the scraping edge of the scraper blade relative to the belt surface, which is undesirable.

Scraper blades having an obtuse cleaning angle have previously been used as shown in U.S. Pat. No. 4,787,500. Ribs and other devices have been used to strengthen the base of a scraper blade, but such reinforcements control vibration of the scraping edge by increasing rigidity, thus reducing resiliency, and thereby increasing the risk of damage to the conveyor belt and the belt cleaning device.

SUMMARY OF THE INVENTION

A conveyor belt scraper is adapted for use in a conveyor belt cleaner for cleaning the surface of a conveyor belt. The conveyor belt scraper includes a mounting base having a first mounting member and a second mounting member. The mounting base is adapted for mounting to a cross-shaft of a conveyor belt cleaning device. The scraper also includes a scraping head having a scraping member and a restraining arm member. The scraping member includes a front scraping surface having a scraping edge and an upper surface extending from the scraping edge such that the front scraping surface and the upper surface are disposed at an acute angle relative to one another about the scraping edge. The front scraping surface is adapted to form an obtuse scraping angle with the surface of the conveyor belt. The scraping member also includes a mounting member and a rib attached to the front scraping surface adjacent the scraping edge. The restraining arm member includes a first end and a second end. The second end of the restraining arm member is attached to the rib of the scraping member. The first end of the restraining arm member includes a mounting member that is adapted to form a selectively interlocking connection with the second mounting member of the mounting base. The scraper also includes a support arm member having a first end including a first mounting member and a second end including a second mounting member. The first mounting member of the support arm member is adapted to form a selective interlocking connection with the first mounting member of the mounting base and the second mounting member of the support arm member is adapted to form a selective interlocking connection with the mounting member of the scraping member such that the support arm member is spaced apart from the restraining arm member. The support arm member is selectively removable and replaceable from the scraping head and the mounting base. The scraping head is similarly removable and replaceable from the support arm member and the mounting base.

The restraining arm member of the scraping head is preferably made from a material having a modulus of elasticity that is higher than the material from which the support arm member is made such that the restraining arm member is relatively resistant to elongation due to tensile loads compared to the support arm member. The restraining arm member is relatively flexible such that it may bend or collapse in response to compressive loads.

DESCRIPTION OF THE DRAWINGS

FIG. 1 is a side elevational view of a scraper blade of the present invention shown mounted on a cross-shaft for engagement with a conveyor belt.

FIG. 2 is a front elevational view of the scraper blade taken along lines 2—2 of FIG. 1.

FIG. 3 is a rear elevational view of the scraper blade taken along lines 3—3 of FIG. 1.

FIG. 4 is a partial side elevational view of a modified embodiment of the scraper blade.

FIG. 5 is a front elevational view of the modified embodiment of the scraper blade taken along lines 5—5 of FIG. 4.

FIG. 6 is a side elevational view of another embodiment of the scraper blade of the present invention shown mounted on a cross-shaft for engagement with a conveyor belt.

FIG. 7 is a front elevational view of the embodiment of the scraper blade of FIG. 6.

FIG. 8 is a rear elevational view of the embodiment of the scraper blade of FIG. 6.

FIG. 11 is a side elevational view of the scraping head shown in FIG. 9.

FIG. 12 is a front elevational view of the scraping head taken along lines 12—12 of FIG. 11.

DESCRIPTION OF THE PREFERRED EMBODIMENTS

Figure 9:
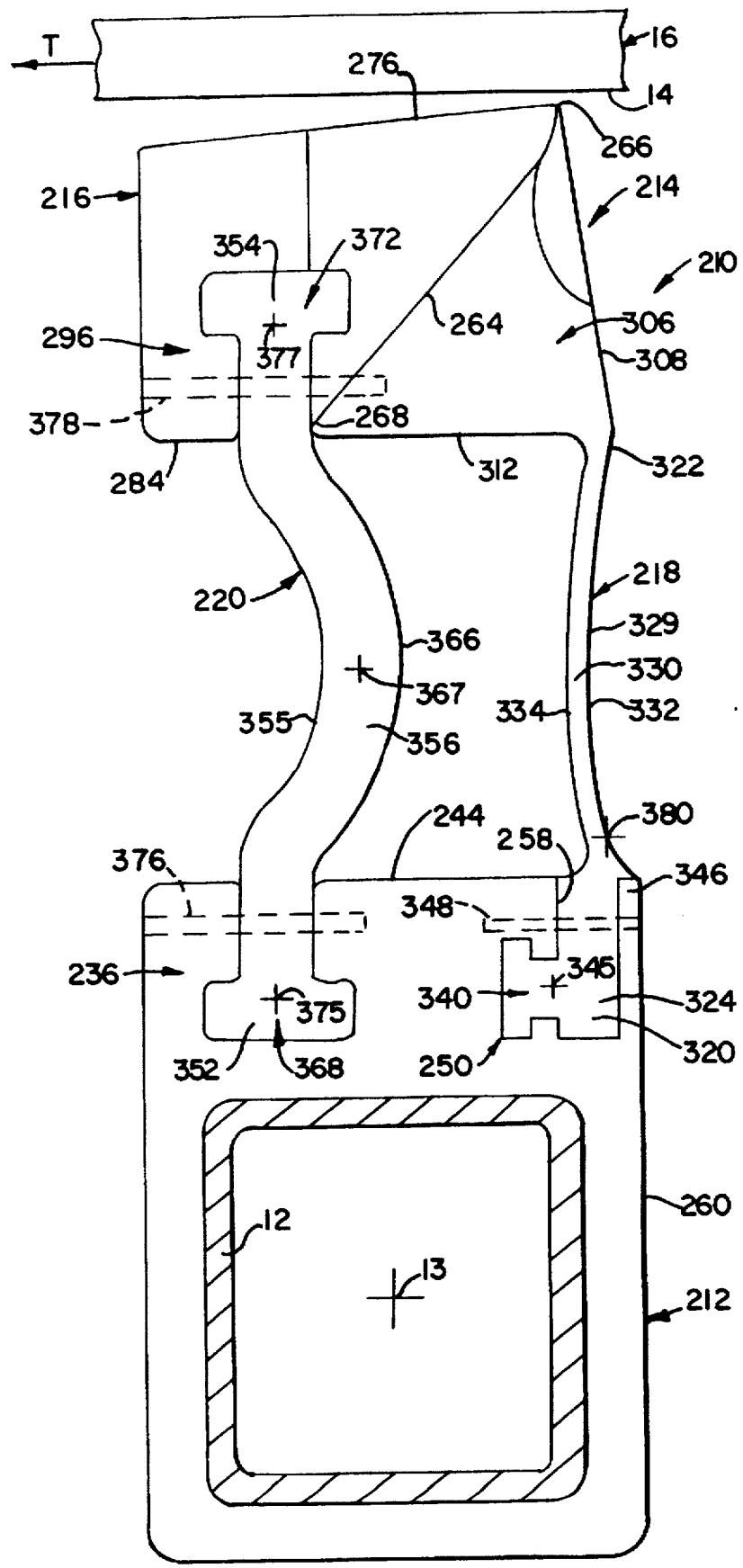
FIG. 9 is a side elevational view of a further modified embodiment of the scraper blade of the present invention shown mounted on a cross-shaft for engagement with a conveyor belt.

FIG. 1 shows one embodiment of the scraper blade 10 mounted on an elongate cross-shaft or support member 12 having a longitudinal axis 13 for scraping engagement with the surface 14 of the return run of a conveyor belt 16. The conveyor belt 16 is shown spaced slightly apart from the scraper blade 10 in FIG. 1 for purposes of illustration, however, the scraper blade 10 would normally be in scraping engagement with the surface 14 of the conveyor belt 16 during operation. The conveyor belt 16 travels in a direction shown by the arrow T. The cross-shaft 12 is shown as a rectangular tubular member, however, other configurations of cross-shafts may be used as desired for supporting one or more scraper blades 10 as part of a conveyor belt cleaner mechanism.

The scraper blade 10 includes a resilient arm member 20 having an upper end portion 22 and a lower base portion 24. The base portion 24 extends between a lower rear edge 25 and a lower front edge 27. The arm member 20 includes a front wall 26 and a spaced apart and opposing rear wall 28. The rear wall 28 is relatively strong in compression while the front wall 26 is relatively weak in compression compared to the rear wall 28. An aperture 30 extends transversely through the arm member 20 between the walls 26 and 28 from a first side wall surface 32 to a second side wall surface 34. The aperture 30 may have various different configurations as desired such as round, rectangular, triangular and variations thereof. The construction of the arm member 20 may be as generally described in U.S. Pat. No. 5,310,042 which is assigned to Martin Engineering the applicant herein. While the arm member 20 of the preferred embodiment includes an aperture 30 as shown in FIG. 1, the arm member 20 may also be formed without the aperture 30, if desired. The arm member 20 is resilient and is preferably made of an elastomeric material such as urethane.

The scraper blade 10 includes a mounting base 40 which is attached to the lower base portion 24 of the arm member 20. The mounting base 40 is shown in FIG. 1 as being generally rectangular with a rectangular aperture 42 extending transversely therethrough. The rectangular aperture 42 is adapted to fit closely around the rectangular cross-shaft 12 such that the mounting base 40 may slide longitudinally along the cross-shaft 12 but cannot rotate relative to the cross-shaft 12 about the longitudinal axis 13. Many other types of mounting arrangements other than the mounting base 40 shown in FIG. 1 may be used, as desired, to mount the arm member 20 to the cross-shaft 12. A plurality of scraper blades 10 may be mounted on the cross-shaft 12 adjacent to one another.

The scraper blade 10 also includes a scraping member 50 which is attached to the upper end portion 22 of the arm member 20. The scraping member 50 includes a front surface 52 having an upper surface portion 55 and a lower surface portion 56. The front surface 52 extends between an upper scraping edge 54 of the upper surface portion 55 and a lower edge of the lower surface portion 56. The front surface 52 faces the oncoming conveyor belt 16 to which material is adhered. As best shown in FIG. 1, the front surface 52 defines an arcuate wall 53 which is in the general shape of a parabola, however, the wall 53 may be circular, generally V-shaped or other configurations as desired. The upper surface portion 55 which extends from the scraping edge 54 is shown as being slightly curved, but may also be planar. The front surface 52 extends transversely, as shown in FIG. 2, between a left edge 58 and a right edge 60. The front surface 52 forms a generally arcuate chamber 61 defined by the wall 53. The chamber 61 has an inlet end at the scraping edge 54 adapted to receive material removed from the belt 16 and an outlet end at the lower surface portion 56 adapted to discharge the removed material from the chamber 61. The scraping member 50 also includes a rear surface 62 spaced apart from and opposed to the front surface 52. A generally planar upper surface 64 extends between the scraping edge 54 and the rear surface 62. The scraping edge 54 and the upper surface 64 are adapted to engage the surface 14 of the conveyor belt 16. Although the upper surface 64 is shown in FIG. 1 as generally horizontal and parallel to the surface 14 of the belt 16 when the scraper blade 10 is in its natural orientation, the upper surface 64 may be orientated in other positions as may be deemed desirable. For example, the upper surface 64 may extend from the scraping edge 54 upwardly or downwardly to the rear surface 62 at an angle to the horizontal.

As shown in FIG. 1, the upper surface portion 55, which adjoins the scraping edge 54, forms an oblique scraping angle with the surface 14 of the conveyor belt 16 providing all of the advantages previously discussed for operation in the peeling mode. The scraping member 50 is resilient and is preferably made of an elastomeric material such as urethane. It is preferred that the aperture 30 in the arm 20 be located as shown in FIG. 1 entirely to the front side of a line extending between the scraping edge 54 and the lower rear edge 25 of the base portion 24 of the arm 22.

The scraper blade 10 also includes a restraining member 70. The restraining member 70 shown in FIGS. 1 and 2 is in the form of a rib having a left side surface 72, a right side surface 74, and an outer surface 76 extending therebetween. The restraining member 70 is attached at its upper end to the upper surface portion 55 of the front surface 52 adjacent the scraping edge 54 at the inlet end of the chamber 61 and extends downwardly along the lower surface portion 56 of the front surface 52 and is attached at its lower end to the lower surface portion 56 of the front surface 52 adjacent the outlet end of the chamber 61. The restraining member 70 prevents separation of the inlet end from the outlet end beyond a predetermined distance which is the distance between the ends when the blade is not engaged against the belt. This effectively controls vibration of the scraper blade during operation. As best shown in FIG. 1, the outer surface 76 of the restraining member 70 extends substantially between the scraping edge 54 and the arm member 20 along a path which is slightly curved but which may be substantially linear. The outer surface 76 of the restraining member 70 preferably forms a right angle or an acute cleaning angle with the surface 14 of the belt 16.

The restraining member 70 is preferably made of an elastomeric material such as urethane. The restraining member 70 must be able to resist any substantial elongation under tensile working loads. The scraper blade 10 may include a plurality of restraining members as illustrated in FIG. 5. Although the restraining member 70 is shown as being external to the scraping member 50, the restraining member may comprise a rigid member such as a plate (not shown) which is embedded in the scraping member 50 and which extends from adjacent the scraping edge 54 to the lower surface portion 56.

In operation, the scraping edge 54 and the upper surface 64 of the scraper blade 10 illustrated in FIGS. 1–3 are pressed into scraping engagement with the surface 14 of the conveyor belt 16. If the upper surface 64 of the blade 10 is formed at an angle extending upwardly from the scraping edge 54, rather than extending horizontally and parallel to the belt 16 as shown in FIG. 1, the arm member 20 will flex as the blade 10 is pressed into engagement with the belt 16 allowing the upper surface 64 to rotate to a position where the upper surface 64 is parallel to and in engagement with the belt 16. If the upper surface 64 is formed at an angle extending downwardly from the scraping edge 54, only the scraping edge 54 and a portion of the upper surface 64 adjacent to the scraping edge 54 may be in engagement with the belt 16. As the belt 16 drags across the scraping edge 54, the scraping member 50 and arm member 20 will resiliently pivot about an axis 80 which extends transversely through the lower base portion 24 of the arm member 20. It is preferred that the scraping edge 54 be located behind the axis 80 such that a line extending through the scraping edge 54 and the axis 80 will form an acute angle with the surface 14 of the conveyor belt 16.

During operation the scraping edge 54 and inlet end of the chamber 61 are prevented by the restraining member 70 from separating from the lower surface portion 56 and outlet end of the chamber 61 beyond a predetermined distance. The restraining member 70 substantially prevents movement of the scraping edge 54 and inlet end of the chamber 61 in either a direction away from or a direction towards the lower surface portion 56 and outlet end of the chamber 61 and thereby substantially prevents movement of the scraping edge 54 with respect to the wall 53 and maintains the profile of the wall 53 substantially uniform during use. The restraining member 70 thereby controls the amplitude of vibration of the scraping edge 54 of the scraper blade 10. Although vibration may be completely eliminated, some amplitude of vibration may be desirable in certain situations such as where the materials being conveyed tend to stick to the blade. In such a situation some amplitude of vibration may be desirable to shed the blade of these sticky materials. This can be accomplished by varying the configuration and design of the restraining member 70 to allow limited separation of the scraping edge 54 from the lower surface portion 56 during use beyond the predetermined distance.

FIGS. 4 and 5 show a scraper blade 90 which is a modified embodiment of the scraper blade 10. The scraper blade 90 includes a mounting base 40 and an arm member 20 as in the scraper blade 10 illustrated in FIGS. 1–3. The scraper blade 90 includes a scraping member 92 which is similar to the scraping member 50 except that the scraping member 92, as shown in FIG. 4, includes a scraping element 94 located in an upper portion of the front surface 93. The scraping element 94 forms a scraping edge 96. The scraping element 94 may alternatively be attached to the upper surface 97 of the scraping member 92. The scraping element 94 is preferably made of a material which is harder than that of the scraping member 92. The scraping element 94 is preferably made from a hard metal such as tungsten carbide. The scraping element 94 provides increased abrasion resistance to reduce wear of the scraper blade from scraping engagement with the belt 16.

The scraper blade 90 includes a pair of restraining members 98 and an arcuate chamber 99. Only one restraining member 98, or more than two restraining members 98, may be used if desired. Each restraining member 98 is an elongate member having an upper end 100 and a lower end 102. The upper end 100 is attached to the upper surface portion 101 of the front surface 93 of the scraping member 92, or to the scraping element 94, adjacent the scraping edge 96 at the inlet end of the chamber 99. The lower end 102 is attached to the outlet end of the chamber 99 at the lower surface portion 103 of the front surface 93 and to the arm member 20. As best shown in FIG. 4, an aperture 104 is formed between the restraining members 98 and the center portion of the front surface 93. The restraining members 98 may be formed from a web of elastomeric material such as urethane, or may be made from other materials such as steel chain or cable. As with the restraining member 70, the restraining members 98 must be able to resist any substantial elongation under tensile working loads.

The scraper blade 90 operates in substantially the same manner as the scraper blade 10. The scraping edge 96 and inlet end of the chamber 99 is prevented by the restraining members 98 from separating from the lower surface portion 103 and outlet end of the chamber 99 beyond a predetermined distance. The restraining members 98 thereby control the amplitude of vibration of the scraping edge 96 of the scraper blade 90.

FIGS. 6–8 illustrate a modified embodiment of the scraper blade of the present invention generally designated with the numeral 110. The scraper blade 110 includes a resilient arm member 112 having a top portion 114 and a bottom portion 116. The bottom portion 116 of the arm member 112 includes a front wall 118 and a spaced apart and opposing rear wall 120. The rear wall 120 is relatively strong in compression, while the front wall 118 is relatively weak in compression compared to the rear wall 120. An aperture 122 extends transversely through the bottom portion 116 of the arm member 112 between the front wall 118 and the rear wall 120 from a first side wall surface 124 to a second side wall surface 126. The bottom portion 116 of the arm member 112 is constructed similarly to the arm member 20 and as generally described in U.S. Pat. No. 5,310,042. Alternatively, the aperture 122 may be eliminated such that the bottom portion 116 is solid. The bottom portion 116 of the arm member 112 is resilient and is preferably made of an elastomeric material such as urethane.

The top portion 114 of the arm member 112 includes a front wall 130 which functions as a restraining member. The front wall 130 includes a bottom end 131 which is attached to and integrally formed with the front wall 118 of the bottom portion 116 and extends upwardly therefrom to an upper edge 132 formed at a top end 133 of the front wall 130. The front wall 130 extends between a left edge 134 and a right edge 136. The left edge 134 extends upwardly from the first side wall surface 124 of the bottom portion 116 to the upper edge 132, and the right edge 136 extends upwardly from the second side wall surface 126 of the bottom portion 116 to the upper edge 132. The left edge 134 and the right edge 136 converge towards one another as they extend from the side wall surfaces 124 and 126 towards the upper edge 132. The front wall 130 is shown as terminating in the generally linear upper edge 132 such that the front wall 130 is in the general shape of a truncated triangle as shown in FIG. 7. The front wall 130, however, may also be formed in the general shape of a triangle wherein the left edge 134 and right edge 136 of the front wall 130 converge at a point, or in other shapes as desired.

The top portion 114 of the arm member 112 also includes a rear wall 140 which functions as a support member. The rear wall 140 extends upwardly from the rear wall 120 of the bottom portion 116 to a top end 142. The rear wall 120 may be spaced apart from, or integrally formed with, the front wall 130. As best shown in FIG. 8, the rear wall 140 is formed in the general shape of a truncated triangle having a left edge 144 which extends between the second side wall surface 126 of the bottom portion 116 and the top end 142 and a right edge 146 which extends upwardly between the first side wall surface 124 of the bottom portion 116 and the top end 142. The top portion 114 also includes a first side wall surface 150 which extends between the right edge 146 of the rear wall 140 and the left edge 134 of the front wall 130. The first side wall surface 150 extends upwardly from the first side wall surface 124 of the bottom portion 116 to an upper edge 152 which extends generally linearly between the upper edge 132 of the front wall 130 and the top end 142 of the rear wall 140. The top portion 114 of the arm member 112 also includes a second side wall surface 154 which extends upwardly from the second side wall surface 126 of the bottom portion 116 to an upper edge 156 and which extends between the left edge 144 of the rear wall 140 and the right edge 136 of the front wall 130. As shown in FIG. 6, the top portion 114 may, if desired, include an aperture 158 as shown in dashed lines which extends through the top portion 114 such that the front wall 130 and the rear wall 140 are spaced apart from one another. The top portion 114 of the arm member 112 is preferably constructed of a resilient elastomeric material such as urethane.

The scraper blade 110 includes a mounting base 164 which is attached to the lower end of the bottom portion 116 of the arm member 112. The mounting base 164 is removably mountable to the cross shaft 12 and is preferably slidable along the cross shaft 12, but cannot rotate relative to the cross shaft 12 about the longitudinal axis 13. The arm member 112 may be mounted to the cross shaft 12 with various types of mounting arrangements as desired.

The scraper blade 110 also includes a scraping member 170 which is integrally attached to the top portion 114 of the arm member 112. The scraping member 170 includes a front surface 172. The front surface 172 is generally planar and extends between a linear scraping edge 174 and a rear edge 176 and between a left edge 178 and a right edge 180. The front surface 172 faces the oncoming conveyor belt 16 to which material is adhered. The scraping member 170 also includes a generally planar upper surface 182 which extends between the scraping edge 174 and a rear edge 184 and between a left edge 186 and a right edge 188. The scraping edge 174 and the upper surface 182 are adapted to slidably engage the surface 14 of the conveyor belt 16. The scraping member 170 also includes a rear surface 190 which extends between the rear edge 184 of the upper surface 182 and the rear edge 176 of the front surface 172 and between a left chamfered edge 192 and a right chamfered edge 194. The scraping member 170 also includes a generally triangular left wall surface 196 which extends between the left edge 186 of the upper surface 182, the left edge 178 of the front surface 172, and the right edge 194 of the rear surface 190. A generally triangular right wall surface 198 extends between the right edge 188 of the upper surface 182, the right edge 180 of the front surface 172, and the left edge 192 of the rear surface 190.

The front surface 172 is disposed at an acute angle relative to the upper surface 182 and is preferably disposed at an angle of approximately sixty degrees relative to the upper surface 182. The front surface 172 is designed to be disposed at an obtuse angle to the surface 14 of the conveyor belt 16. The front surface 172 may be generally planar or may be curved between the scraping edge 174 and the rear edge 176. The rear surface 190 is shown as being curved but may be planar. As best shown in FIG. 6, the scraping member 170 is generally triangular in cross section. The scraping member 170 may be made of various materials as desired, such as urethane. The scraping member 170 may include a metallic scraping element such as the scraping element 94 shown in FIG. 4. The scraping member 170 may be formed entirely or in part with a low-friction material such as nylon, ultra high molecular weight polyethylene, polytetrafluoroethylene (PTFE), silicon or a low-friction material sold under the name XYLETHON by DuraWear Corporation of Birmingham, Ala. The low-friction material preferably has a sliding coefficient of friction equal to or less than 0.7 with rubber and in the preferred embodiment equal to or less than 0.6 with rubber. The low-friction material may be provided in the form of an insert 200 molded integrally with, or mechanically fastened to, the scraping member 170 or arm member 112. As shown in FIG. 6, the insert 200 may be generally triangular extending between a rear edge 202, the upper surface 182 and the front surface 180, forming a portion of the upper surface 182, the front surface 180 and the scraping edge 174. The insert 200 may also be formed in other shapes as desired and may comprise a layer having a desired thickness which forms the upper surface 182, or a portion thereof, and the scraping edge 174. The low-friction material reduces friction and the amount of drag force created between the upper surface 182 and the surface 14 of the conveyor belt 16.

The top end 133 of the front wall 130 of the top portion 114 of the arm member 112 is attached to the front surface 172 of the scraping member 170 such that the top end 133 and the upper edge 132 of the front wall 130 are located at the scraping edge 170, or closely adjacent thereto as shown in FIG. 6. The bottom end 131 of the front wall 130 is attached to the front wall 118 of the bottom portion 116 of the arm member 112 and thereby to the mounting base 164. The rear wall 140 of the top portion 114 is attached to the front surface 172 of the scraping member 170 preferably at the rear edge 176 of the front surface 172.

In operation, the scraping edge 174 and upper surface 182 of the scraping member 170 are pressed into scraping engagement with the surface 14 of the conveyor belt 16. This requires a counterclockwise rotation from the position illustrated in FIG. 6. The scraping edge 174 and the front surface 172 remove adherent material from the surface 14 of the conveyor belt 16. The removed adherent material travels along the front surface 172 and is discharged at the rear edge 176 of the front surface 172. The front surface 172 is located at an approximate angle of 60° relative to the upper surface 182. Material which is removed from the conveyor belt 16 therefore changes its direction of travel by approximately 60° as it changes from its direction of travel along the belt 16 to its direction of travel along the front surface 172. The small change in the angle of travel of the removed material provided by the scraping member 170 results in a relatively small force being applied to the scraping member 170 by the adherent material which engages the front surface 172. This force attempts to separate the scraping member 170 from the conveyor belt 16. A small or reduced separating force as provided by the scraping member 170 therefore improves cleaning operations. The front wall 130 as shown in FIG. 7 includes a small profile, especially at the upper edge 132, which faces the oncoming adherent material and thereby provides a small area for the adherent material to come into contact with the top portion 114 of the arm member 112.

The front wall 130 functions as a restraining member and substantially prevents movement of the scraping edge 174 towards or away from the bottom portion 118 of the arm 112. The restraining member 130 of the top portion 114 thereby controls the amplitude of vibration of the scraping edge 174 of the scraper blade 110. As previously stated, some vibration may be desirable. This can be accomplished by varying the design of the top portion 114 and its attachment to the scraping member 170 to allow some pivotal movement of the scraping edge 174.

FIGS. 9–14 illustrate another modified embodiment of the conveyor belt scraper blade of the present invention generally designated with the reference numeral 210. The conveyor belt scraper blade 210 is shown in FIG. 9 mounted on the cross-shaft 12. The scraper blade 210 includes a mounting base 212, a scraping head 214 including a scraping member 216 and a restraining arm member 218, and a support arm member 220.

Figure 10:
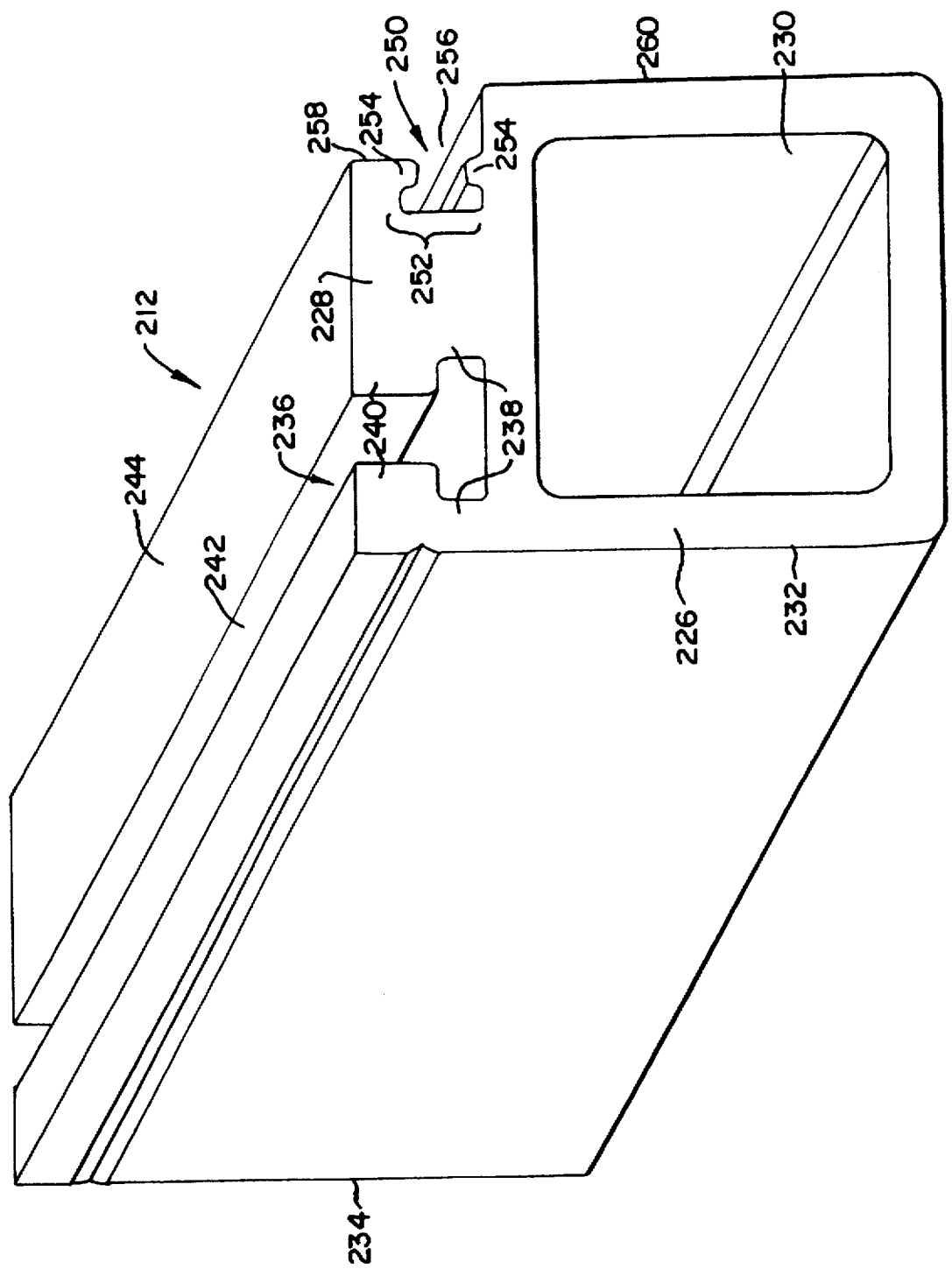
FIG. 10 is a perspective view of the mounting base shown in FIG. 9.

As best shown in FIGS. 9 and 10, the mounting base 212 of the scraper blade 210 includes a lower portion 226 and an upper portion 228. The lower portion 226 includes a generally rectangular aperture 230 such that the mounting base 212 is adapted to slidably fit around and in close engagement with the rectangular cross-shaft 12. The mounting base 212 is removably mountable on the cross-shaft 12 and is selectively slidable along the cross-shaft 12, but cannot rotate relative to the cross-shaft 12 about the longitudinal axis 13. The mounting base 212 extends between a first end 232 and a second end 234. The length of the mounting base 212 between the first and second ends 232 and 234 may be varied as desired such that the mounting base 212 may be adapted to mount one or more scraping heads 214 and associated support arm members 220 in a side-by-side relationship thereon and to the cross-shaft 12.

The upper portion 228 of the mounting base 212 includes a first mounting member comprising a first generally T-shaped groove or channel 236 which extends from the first end 232 to the second end 234 of the mounting base 212.

The first channel 236 is formed by a pair of opposing and spaced apart side wall portions 238 and a pair of opposing and inwardly extending ribs 240 that form a slot 242 therebetween at a top surface 244 of the mounting base 212.

The upper portion 228 of the mounting base 212 also includes a second mounting member comprising a second generally T-shaped groove or channel 250. The second channel 250 is formed by a pair of opposing and spaced apart side wall portions 252 and a pair of opposing and inwardly extending ribs 254. A slot 256 is formed between the ribs 254 in a side surface 258 of the upper portion 228 of the mounting base 212. The second channel 250 extends from the first end 232 to the second end 234 of the mounting base 212 in a direction generally parallel to and spaced apart from the first channel 236. The side surface 258 of the upper portion 228 of the mounting base 212 is spaced inwardly and generally parallel to a side surface 260 of the lower portion 226 of the mounting base 212 such that a corner recess is formed in the mounting base 212 adjacent to the second channel 250.

The mounting base 212 is preferably made from an elastomeric material, such as urethane, having a hardness which measures 95 Shore A durometer or higher, wherein a higher Shore A durometer number indicates a harder material. The same numerical value i.e. 95 on the Shore D durometer scale indicates a harder material than the comparable Shore A scale. The mounting base 212 may also be made from other types of plastic materials that are relatively rigid, from various types of metals, or from other rigid materials. The mounting base 212 may be formed as part of the cross-shaft 12.

The scraping head 214 of the scraper blade 210 is best shown in FIGS. 11 and 12. The scraping member 216 of the scraping head 214 includes a front scraping surface 264 that extends between a generally linear scraping edge 266 and an opposing rear edge 268 and that extends between a left edge 270 and a right edge 272. The front scraping surface 264 includes a generally planar portion 273 and a curved portion 274 adjacent to the scraping edge 266. The front scraping surface 264 faces the oncoming conveyor belt 16 to which material is adhered. The scraping member 216 also includes a generally planar upper surface 276 that extends between the scraping edge 266 and a rear edge 278. The scraping edge 266 and the upper surface 276 are adapted to slidably engage the surface 14 of the conveyor belt 16.

The scraping member 216 also includes a rear surface 280 that extends downwardly from the rear edge 278 of the upper surface 276 to a bottom edge 282, and a bottom surface 284 that extends from the bottom edge 282 towards the rear edge 268 of the front scraping surface 264. The scraping member 216 also includes a generally triangular side wall surface portion 286 on each side of the scraping member 216 that extends between the front scraping surface 264, the upper surface 276 and an edge 288. The triangular side wall surface portions 286 are generally parallel to one another and perpendicular to the scraping edge 266. An angular wall surface portion 290 extends respectively from each edge 288 to a respective rear edge 292 located at each side of the rear surface 280. Each angular wall surface portion 290 extends at an angle of approximately 30° relative to its adjoining triangular side wall surface portion 286.

The scraping member 216 includes a mounting member in the form of a generally T-shaped groove or channel 296. The channel 296 is formed by a pair of opposing and spaced apart side wall portions 298 and a pair of opposing and inwardly extending ribs 300. The ribs 300 form a slot 302 in the bottom surface 284 of the scraping member 216. The channel 296 is generally linear and extends generally parallel to the scraping edge 266. The channel 296 is preferably substantially identical in cross-sectional size and shape to the first channel 236 of the mounting base 212.

The scraping member 216 also includes a rib 306 attached to the front scraping surface 264. The rib 306 includes a generally triangular-shaped front surface 308 as best shown in FIG. 12 which extends from an apex located at or adjacent to the scraping edge 266 to a bottom edge 310. A generally rectangular bottom surface 312 extends from the bottom edge 310 of the front surface 308 of the rib 306 to the rear edge 268 of the front scraping surface 264. A pair of generally triangular-shaped side wall surfaces 314 respectively extend on each side of the rib 306 between the front surface 308, the front scraping surface 264 and the bottom surface 312. The rib 306 includes a pair of recessed portions 316 that aid in directing the flow of material that has been removed from the conveyor belt 16.

The front scraping surface 264 is disposed at an acute angle relative to the upper surface 276 at the scraping edge 266. The front scraping surface 264 is designed to be disposed at an obtuse angle to the surface 14 of the conveyor belt 16. The scraping member 216 may be made of various materials as desired. One preferred material is an elastomeric material such as urethane having a durometer of 95 Shore A or higher. The scraping member 216, if desired, may include a metallic scraping element or a non-metallic scraping element comprising a hard wearing material, such as ceramic, at the scraping edge 266. The scraping member 216 may be formed entirely or in part with a low friction material that has a sliding coefficient of friction equal to or less than 0.7 with rubber and preferably equal to or less than 0.6 with rubber. The low-friction material may be provided in the form of an insert molded integrally with or mechanically fastened to the scraping member 216. When the scraping member 216 will encounter high temperatures during service, the scraping member 216 may be formed from a heat resistant material, such as metal or a ceramic material, that is suitable for operating under high service temperatures.

The restraining arm member 218 extends between the scraping member 216 and the mounting base 212. As best shown in FIGS. 11 and 12, the restraining arm member 218 extends between a first end 320 and a second end 322. The restraining arm member 218 includes a generally rectangular parallelepiped base 324 at the first end 320 of the restraining arm member 218 that extends between a left end 326 and a right end 328. The width of the base 324 between the left end 326 and the right end 328 is substantially equal to the length of the scraping edge 266. The restraining arm member 218 also includes a link member 329 in the form of a web 330 that extends from the base 324 to the second end 322 of the restraining arm member 218. The web 330 includes a front surface 332 and a rear surface 334 which is substantially uniformly spaced apart from the front surface 332. The web 330 extends between a left edge 336 and a right edge 338. As shown in FIG. 11, the web 330 is relatively thin between the front and rear surfaces 332 and 334 in relation to the length of the web 330 between the base 324 and the second end 322 of the restraining arm member 218. As shown in FIG. 9, the web 330 is slightly inwardly curved about a horizontal axis such that the front surface 332 is concavely curved and the rear surface 334 is convexly curved.

The second end 322 of the restraining arm member 218 is shown as being integrally attached to the rib 306 of the scraping member 216 adjacent the bottom edge 310 of the front surface 308 of the rib 306. Although the second end 322 of the restraining arm member 218 is shown as being integrally connected to the scraping member 216, the second end 322 can be removably connected to the scraping member 216 if desired using a selective interlocking connection such as formed by the mounting member 340 and the second channel 250. The second end 322 of the restraining arm member 218 is spaced apart from the channel 296 of the scraping member 216.

The first end 320 of the restraining arm member 218 includes a generally T-shaped mounting member 340 that is attached to the base 324. The mounting member 340 extends from the left end 326 to the right end 328 of the base 324 and is generally parallel to the scraping edge 266. The mounting member 340 includes a stem 342 that is attached to the base 324 and a flange 344 attached to the end of the stem 342. The T-shaped mounting member 340 is adapted to fit in the second T-shaped channel 250 of the mounting base 212 to form a selective interlocking connection between the restraining arm member 218 and the mounting base 212. The mounting member 340 can be slid along a longitudinal axis 345 with respect to the second channel 250 to selectively attach or remove the restraining arm member 218 from the mounting base 212. While the mounting member 340 and the second channel 250 provide a selectively releasable interlocking mounting arrangement between the restraining arm member 218 and the mounting base 212, the mounting arrangement resists detachment of the restraining arm member 218 from the mounting base 212 in response to tensile or compressive forces that may be applied to the restraining arm member 218 by the scraping member 216 and the mounting base 212.

If desired, a generally rectangular parallelepiped backing plate 346, such as a rigid metallic or plastic plate, may be located against one side of the base 324 such that the base 324 is sandwiched between the backing plate 346 and the mounting base 212. A fastener 348 such as a screw, bolt, pin or similar locking device can be inserted through the backing plate 346, through the base 324 of the restraining arm member 218, and into the mounting base 212 to prevent longitudinal movement between the base 324 of the restraining arm member 218 and the mounting base 212. The fastener 348 is selectively removable such that the restraining arm member 218 can slide longitudinally and be selectively removed from and mounted on the mounting base 212. One or more fasteners 348 may be utilized to prevent linear sliding movement of the base 324 with or without the backing plate 346.

Figure 14:
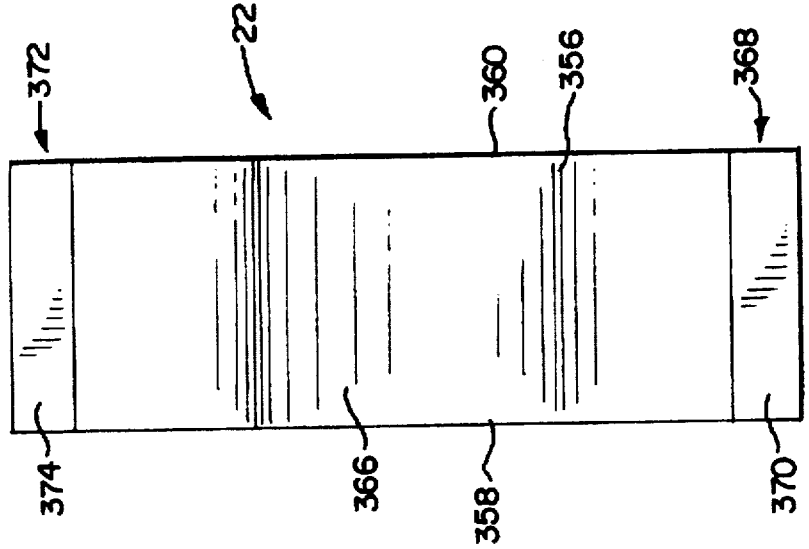
FIG. 14 is a front elevational view of the support arm member taken along lines 14—14 of FIG. 13.
Figure 13:
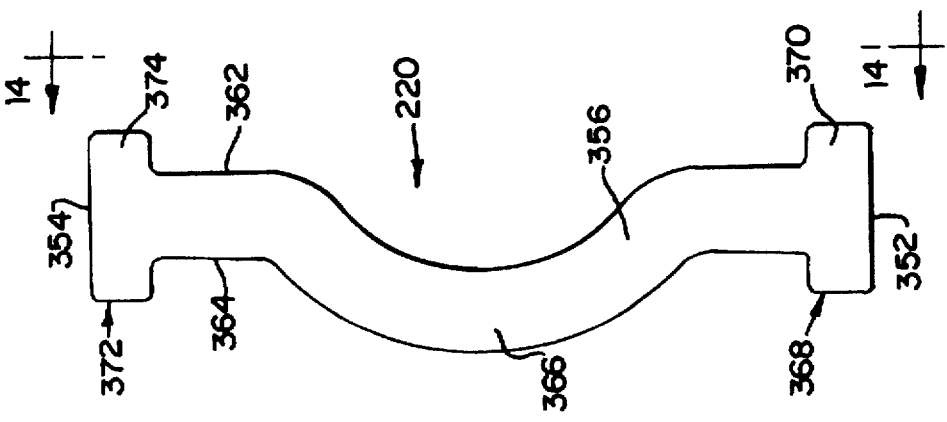
FIG. 13 is a side elevational view of the support arm member taken from the opposite side of the support arm member as shown in FIG. 9.

The support arm member 220 of the scraper blade 210, as shown in FIGS. 13 and 14, includes a first end 352, a second end 354, and a link member 355 in the form of a web 356 that extends between the first and second ends 352 and 354. The web 356 extends between a left end 358 and a right end 360 and includes a first surface 362 and a second surface 364 which is substantially uniformly spaced apart from the first surface 362. As shown in FIG. 13 the web 356 of the support arm member 220 is thicker between the first and second surfaces 362 and 364 relative to the length of the web 356 as compared to the web 330 of the restraining arm member 218. As shown in FIG. 13, the web 356 includes a nonplanar segment 366 that is generally centrally located between the first and second ends 352 and 354 of the support arm member 220. The non-planar segment 366 is formed in the shape of an arc of a circle about a generally horizontal axis, such that the web 356 is nonlinear between the first and second ends 352 and 354 of the support arm member 220. The nonplanar segment 366 of the web 356 may be formed in various different shapes as desired such that the nonplanar segment 366 and the web 356 comprise a resilient spring member that may resiliently collapse by flexing about an axis 367 in response to a compressive force applied to the first and second ends 352 and 354 of the support arm member 220. As shown in FIG. 9, the nonplanar segment 366 is curved or bowed generally inwardly and convexly towards the restraining arm member 218. However, the nonplanar segment 366 may alternatively be reversed such that it is curved or bowed outwardly and convexly away from the restraining arm member 218.

The support arm member 220 includes a first generally T-shaped mounting member 368 at the first end 352 of the support arm member 220. The first mounting member 368 includes a flange 370 attached to the lower end of the web 356. The support arm member 220 also includes a second T-shaped mounting member 372 located at the second end 354 of the support arm member 220. The second mounting member 372 includes a flange 374 attached to an upper end of the web 356. The mounting members 368 and 372 are preferably substantially identical to one another in shape and size.

The T-shaped mounting member 368 of the support arm member 220 is adapted to fit within the first T-shaped channel 236 of the mounting base 212 to form a selective interlocking connection between the support arm member 220 and the mounting base 212. The selective interlocking connection formed by the first mounting member 368 and the first channel 236 allows selective sliding movement of the support arm member 220 along a longitudinal axis 375 with respect to the mounting base 212. The selective interlocking connection formed by the mounting member 368 and the first channel 236 prevents disengagement of the support arm member 220 from the mounting base 212 when the web 356 is subjected to either tensile or compressive forces by the scraping head 216 and the mounting base 212. As best shown in FIG. 9, one or more fasteners 376 may be removably inserted into the mounting base 212 and through the lower end of the web 356 to selectively prevent sliding movement of the support arm member 220 relative to the mounting base 212.

The second mounting member 372 of the support arm member 220 is adapted to fit within and provide a selective interlocking connection with the channel 296 of the scraping member 216. The selective interlocking connection formed between the second mounting member 372 and the channel 296 allows the support arm member 220 to selectively slide within the channel 296 along a longitudinal axis 377 with respect to the scraping member 216. However, the selective interlocking connection formed by the mounting member 372 and the channel 296 prevents disengagement of the support arm member 220 from the scraping member 216 when the web 356 is subjected to either tensile or compressive forces by the mounting base 212 and the scraping head 216. If desired, one or more fasteners 378 may be removably inserted into the scraping member 216 and through the upper end of the web 356 to selectively prevent the support arm member 220 from sliding relative to the scraping member 216.

The scraping blade 210 has been described herein as including generally T-shaped channel mounting members 236,250 and 296 and generally T-shaped mounting members 340, 368 and 372 that are adapted to respectively interfit with one another to provide selectively releasable connections between the support arm member 220 and the mounting base 212, between the support arm member 220 and the scraping member 216, and between the restraining arm member 218 and the mounting base 212. Each of these connector means comprising a T-shaped channel and an interfitting T-shaped mounting member may be replaced by other connector means that provide a selectively releasable connection between two members. Such alternate connector means can include mechanical fasteners, such as screws, bolts, pins and plates that are inserted in and/or through the members to be connected together and a wide variety of additional connection mechanisms suitable to provide a selectively releasable connection. The channels 236, 250 and 296 and the mounting members 340, 368 and 372 may be formed in shapes other than a T-shape, such as an L-shape, V-shape, U-shape and other shapes.

The support arm member 220 is substantially nonlinear between the first and second ends 352 and 354 of the support arm member 220 such that the support arm member is resiliently and flexibly collapsible about the axis 367 in response to an operational scraping force applied to the scraping edge 266 by the conveyor belt 16. The support arm member 220 is flexibly collapsible from a first position as shown in FIG. 9, wherein the scraping force is zero in magnitude and the first and second ends of the support arm member 220 are spaced apart from one another a first linear distance, to a second position when a scraping force is applied to the scraping edge 266 such that the second end 354 of the support arm member 220 moves closer to the first end 352 and the first and second ends 352 and 354 are spaced apart a second linear distance which is shorter than the first linear distance. The support arm member 220 collapses by flexing or bending about the axis 367 as opposed to undergoing an elastic or physical shortening of the support arm member 220.

The restraining arm member 218 is substantially inelastic such that the restraining arm member 218 substantially resists physical elongation or stretching between the first and second ends 320 and 322 of the restraining arm member 218 during the flexible collapse of the support arm member 220 from the first position towards the second position. The restraining arm member 218 is substantially inelastic although it may undergo a relatively small change in physical length. Once the support arm member 220 has collapsed to a position wherein it can no further collapse or flex about the axis 367, the restraining arm member 318 may then undergo a substantial physical elongation due to a large scraping force applied to the scraping edge 266.

The restraining arm member 218 is preferably formed from a material that has a higher modulus of elasticity than the material which forms the support arm member 220, such that the restraining arm member 218 is more inelastic or resistant to a change in length for a given length and cross-sectional area of the restraining arm member 218 in response to a given tensile or compressive force, than is the support arm member 220 for the same length, cross-sectional area and force. The restraining arm member 218 and the support arm member 220 are both preferably made from an elastomeric material such as urethane. The restraining arm member 218 is preferably made from a urethane having a durometer of 95 Shore A or higher. The support arm member 220 is preferably made from a urethane having a lower durometer than the restraining arm member 218, such as a durometer of 80–90 Shore A.

The restraining arm member 218 is made from a material that has a relatively high modulus of elasticity or a high durometer of hardness such that the restraining arm member 218 is substantially inelastic (substantially resistant to physical change in length) and will undergo as little strain or change in physical length as possible resulting from the tensile forces that are applied to the restraining arm member 218 by the scraping member 216 and the mounting base 212 during normal operation of the scraper blade 210. However, the web 330 of the restraining arm member 218 must remain sufficiently flexible such that the web 330 may flexibly collapse upon itself when the web 330 is subjected to a compressive force of a predetermined magnitude by the scraping member 216 and the mounting base 212, such as when the conveyor belt reverses its normal direction of travel, to avoid damage to the scraper blade 210, the conveyor belt cleaning mechanism, and the conveyor belt 16.

As shown in FIG. 9, the web 330 of the restraining arm member 218 is curved between the base 324 and the first end 320 of the restraining arm member 218. When the web 330 is subjected to a tensile force, the web 330 will become generally planar such that the second end 322 will move farther away from the base 324. This change in the distance between the base 324 and the second end 322 of the restraining arm member 218 is due to a change in the geometric configuration of the web 330 and differs from and does not correspond to an elastic change in the physical length of the web 330. The physical length of the web 330 is measured along its centerline and not as the linear distance between the respective ends of the web 330.

The link member 329 of the restraining arm member 218 may be formed other than as a web 330 of elastomeric material having a relatively high modulus of elasticity or hardness, while still being substantially inelastic and being sufficiently flexible to collapse under compressive forces. The link member 329 may comprise a chain made of metal, plastic or other materials, one or more cables or filaments made of metal, plastic or other materials, or a mesh made of metal, plastic or other materials. The link member 329 may also comprise a web formed from a metallic material. The link member 355 of the support arm member 220 may also be formed of different materials and in different configurations from the web 356 of elastomeric material shown in FIG. 9. The link member 355 may be formed as a metallic web. The link member 355 may also be formed as a helical coil spring formed from metal, plastic or other materials. Thus, the restraining arm member 218 could be formed as an elastomeric web and the support arm member 220 could be formed as a metal coil spring such that the support arm member 220 is formed with a material having a higher modulus of elasticity than the material of the restraining arm member 218.

In operation, the scraping edge 266 and upper surface 276 of the scraping member 216 are pressed into scraping engagement with the surface 14 of the conveyor belt 16. As the belt 16 drags across the scraping edge 266, a scraping force will be applied to the scraping edge 266 by the conveyor belt 16. The scraping member 216 and the restraining arm member 218 will resiliently pivot about a pivot axis 380 which extends transversely through the lower end of the web 330 of the restraining arm member 218, and which is preferably located in the front surface 332 of the web 330 as shown in FIG. 9. It is preferable to have the pivot axis 380 located as close as possible to the front surface 332 of the restraining arm member 218 to eliminate vibrations that may otherwise be caused when high drag forces between the belt 16 and the scraping member 216 are encountered. Making the restraining arm member 218 substantially physically resistant to elongation or strain moves the pivot axis 380 toward the front surface 332 as opposed to a more centrally located position as shown by the axis 80 in FIG. 1 that results when the restraining arm member is more susceptible to strain or elongation.

The scraping edge 266 removes adherent material from the surface 14 of the conveyor belt 16. The removed adherent material then travels along the front scraping surface 264 and is discharged at the rear edge 268 of the front scraping surface 264. The planar portion of the scraping surface 264 is located at an approximate angle of 33° relative to the upper surface 276. Material which is removed from the conveyor belt 16 therefore changes its directional of travel by approximately 33° as it changes from its direction of travel along the belt 16 to its direction of travel along the front scraping surface 264. The small change in the angle of travel of the removed material provided by the scraping member 216 results in a relatively small force being applied to the scraping member 216 by the adherent material which engages the front scraping surface 264. This force attempts to separate the scraping member 216 from the conveyor belt 16. A small or reduced separating force as provided by the scraping member 216 therefore improves cleaning operations.

The restraining arm member 218 in combination with the rib 306 functions to restrain and substantially prevent movement of the scraping edge 266 in a direction away from the base 324 of the restraining arm member 218 and from the mounting base 212. The restraining arm member 218 thereby controls the amplitude of vibration of the scraper blade 210. However, as previously stated, some vibration may be desirable. During normal cleaning operations the restraining arm member 218 is subjected to tensile forces by the scraping member 216 and the mounting base 212. However, should the direction of rotation of the conveyor belt be reversed, the restraining arm member 218 will be subjected to compressive forces. The web 330 of the restraining arm member 218 is designed to resiliently collapse upon the application of a predetermined compressive force when the conveyor belt 16 reverses its direction of rotation to prevent damage to the scraper blade 210, the cross-shaft 12 and the conveyor belt 16.

During normal cleaning operations, the support arm member 220 is subjected to compressive forces between the scraping member 216 and the mounting base 212 that are generated by the scraping force applied to the scraping edge 266. When a scraping force is applied to the scraping edge 266, the support arm member 220 will move from its first position as shown in FIG. 9, wherein the scraping force is zero and the support arm member 220 is unstressed, to a second position, wherein the support arm member 220 has flexed about the axis 367, while the restraining arm member 218 substantially resists any physical elongation. The support arm member 220 must be capable of bearing sufficient compressive loads in order to press the scraping member 216 against the conveyor belt 16 with the desired amount of force, yet remain sufficiently flexible and resilient to permit a range of movement due to a change in the distance between the first end 352 and second end 354 of the support arm member 220 to accommodate various scraping forces and should the scraping member 216 engage an object on the belt 16 that does not separate from the belt, such as a belt splice or material that may be frozen to the belt, to prevent damage to the scraper blade 210.

The thickness of the web 366 between its first surface 362 and second surface 364, and the width of the web 356 between its left end 358 and right end 360 may be varied as desired to provide the desired structural properties and operating characteristics to the support arm member 220. In addition, the support arm member 220 may be made of materials having various different durometers of hardness, different modulis of elasticity, and different configurations to also provide the required structural properties and operating characteristics to the support arm member 220.

The support arm member 220 is removable and replaceable from the mounting base 212 and the scraping head 214 such that one support arm member 220 may be replaced with a second support arm member 220 having a different shape or cross-sectional area or that is made from a different material having a different modulus of elasticity or hardness, to vary the operating characteristics of the scraper blade 210 without having to replace the mounting base 212 or the scraping head 214 of the scraper blade 210. Thus the operator may select an arm member 220 from a variety of members in stock, each having a different operating characteristic. Support arm members 220 can be substituted until one which produces optimum results is installed. In addition, when the scraping member 216 has worn down through use, the worn scraping member 216 may be removed from the support arm 220 and the mounting base 212 and replaced with a new scraping member 216.

Figure 15:
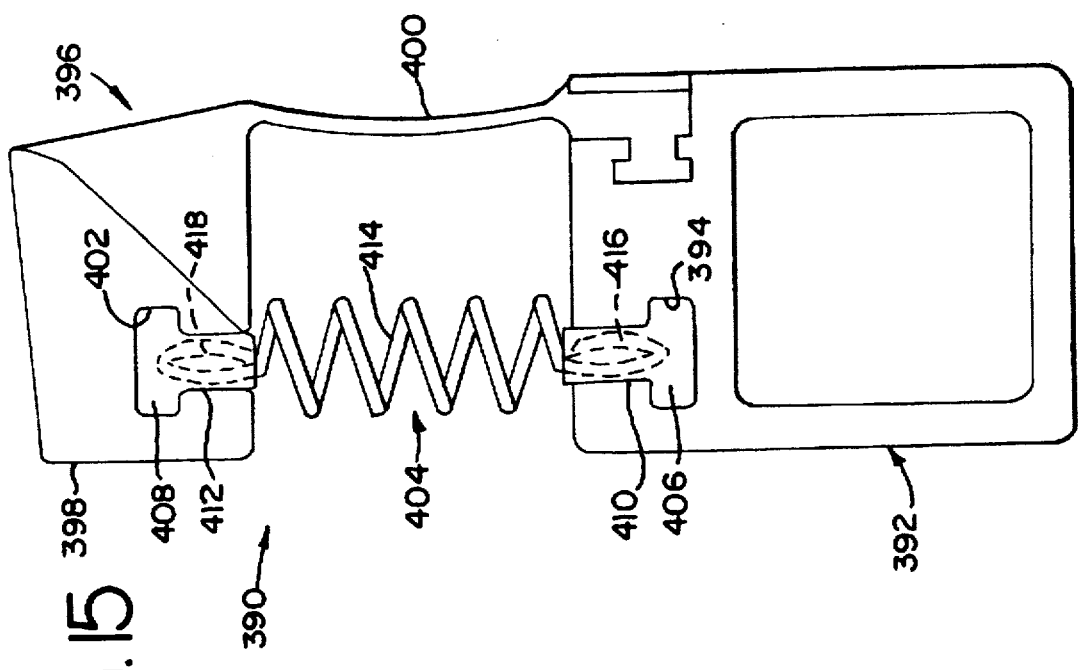
FIG. 15 is a side elevational view of a further modified embodiment of the scraper blade of the present invention.

FIG. 15 illustrates a modified embodiment of the conveyor belt scraper 210 shown in FIGS. 9–14 and is generally designated with the reference numeral 390. The scraper blade 390 includes a mounting base 392 that is constructed substantially similar to the mounting base 212. The mounting base 392 includes a first mounting member comprising a generally T-shaped groove or channel 394. The scraper blade 390 also includes a scraping head 396 that is constructed substantially similar to the scraping head 214. The scraping head 396 includes a scraping member 398 and a restraining arm member 400. The scraping member 398 includes a mounting member comprising a generally T-shaped groove or channel 402.

The scraper blade 390 also includes a support arm member 404. The support arm member 404 extends between a first end 406 and a second end 408. The support arm member 404 includes a first generally T-shaped mounting member 410 at the first end 406 that is adapted to fit within the channel 394 to form a selective interlocking connection between the support arm member 404 and the mounting base 392. The support arm member 404 also includes a second generally T-shaped mounting member 412 at the second end 408 that is adapted to fit within the channel 402 to form a selective interlocking connection between the support arm member 404 and the scraping member 398. A link member in the form of a helical coil spring 414 has a first end 416 attached to the first mounting member 410 and a second end 418 attached to the second mounting member 412. The coil spring 414 can be formed from metal, plastic or other suitable materials. The coil spring 414 is helically wound about a central longitudinal axis that extends linearly between the mounting members 410 and 412.

The support arm member 404 is resiliently collapsible in response to an operational scraping force applied to the scraping member 398 by the conveyor belt. The support arm member 404 is flexibly collapsible from a first position, as shown in FIG. 15, wherein the scraping force is zero in magnitude and wherein the first and second ends 406 and 408 of the support arm member 404 are spaced apart from one another a first linear distance, towards a second position when a scraping force is applied to the scraping member 398 such that the second end 408 of the support arm member 404 moves closer to the first end 406 and the first and second ends 406 and 408 are spaced apart a second linear distance which is shorter than the first linear distance. Although the coil spring 414 collapses in a generally linear direction and becomes shortened as measured in a linear direction between its ends 416 and 418, the coil spring shortens by the bending or flexing of the coils that comprise the coil spring as opposed to a physical shortening of the length of the coil spring as measured in a helical direction along the centerline of the coils. The restraining arm member 400 is substantially inelastic such that the restraining arm member 400 substantially resists physical elongation or stretching during the flexible collapse of the support arm member 404 from the first position towards the second position.

Figure 16:
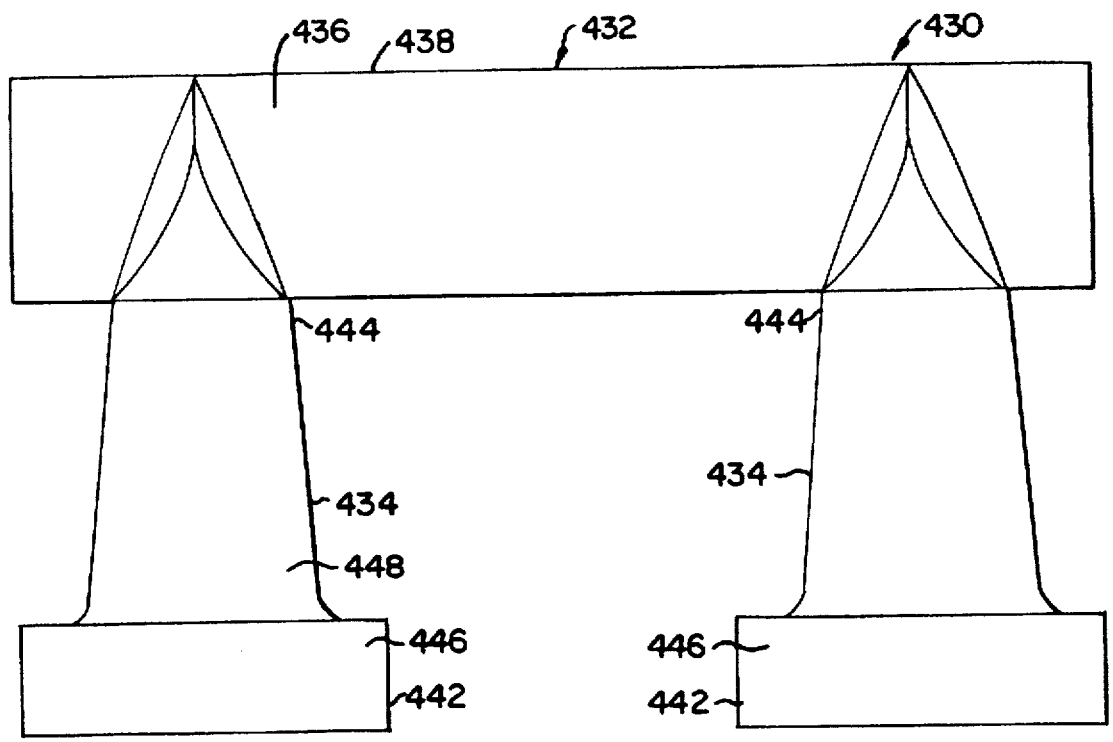
FIG. 16 is a front elevational view of a modified scraping head.
Figure 17:
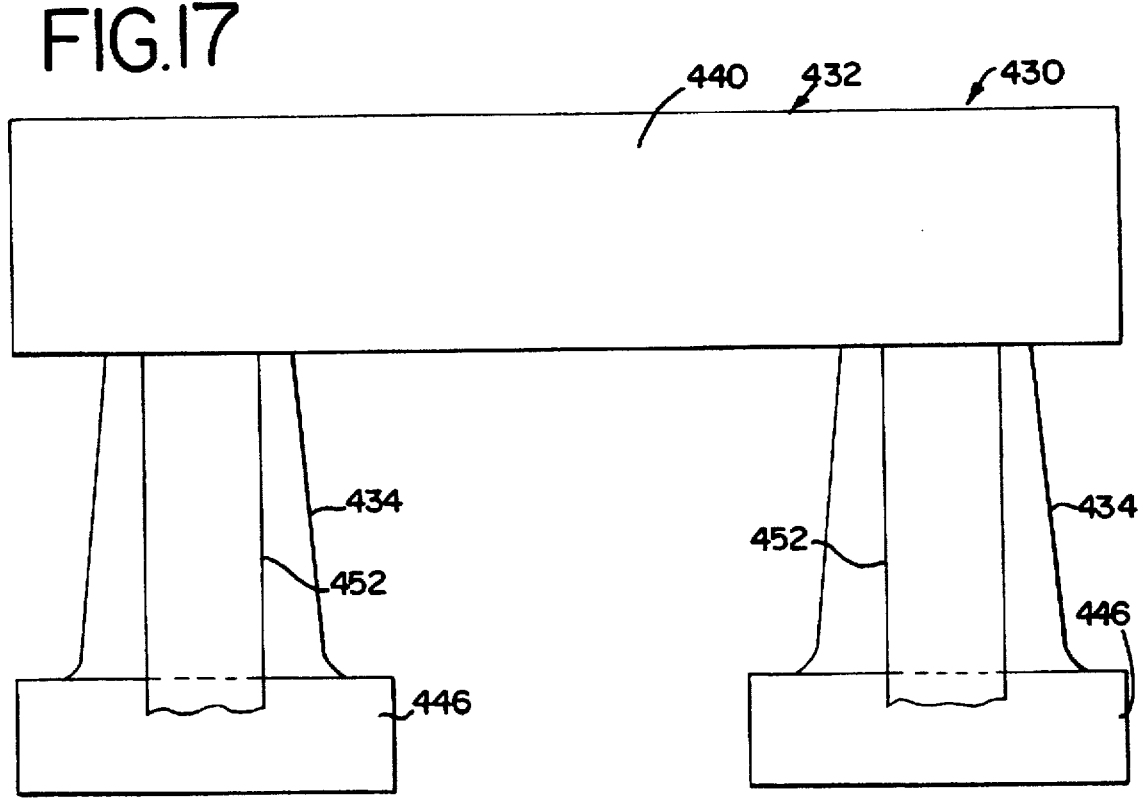
FIG. 17 is a rear elevational view of the modified scraping head of FIG. 16.

FIGS. 16 and 17 illustrate a modified scraping head 430 that is usable in connection with the mounting base 212 shown in FIG. 10. The scraping head 430 includes a scraping member 432 and a plurality of restraining arm members 434. The scraping member 432 is constructed substantially similar to the scraping member 216. The scraping member 432 includes a front surface 436 having a scraping edge 438 as shown in FIG. 16 and a rear surface 440 as shown in FIG. 17. The restraining arm members 434 are constructed substantially similar to the restraining arm member 218. Each restraining arm member 434 extends between a first end 442 and a second end 444. Each restraining arm member 434 includes a base 446 at the first end 442 that is constructed substantially similar to the base 324 as shown in FIGS. 11 and 12. Each restraining arm member 434 includes a link member in the form of a web 448 that extends from the base 446 to the second end 442 of the restraining arm member 434.

As shown in FIG. 17, two support arm members 452 are attached to the scraping member 432. Additional support arm members 452 may be attached to the scraping member 432 if desired. The support arm members 452 may be constructed substantially similar to the support arm member 220 shown in FIG. 9 or the support arm member 404 shown in FIG. 15. The support arm members 452 and the restraining arm members 434 are adapted to be attached to the mounting base 212 shown in FIG. 10. A scraper blade including the scraping head 430 with a plurality of restraining arm members 434 and a plurality of support arm members 452 operates in substantially the same manner as the scraper blade 210.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt scraper adapted for use in cleaning the surface of a conveyor belt, said scraper including:
   a first resilient arm member having a first end and a second end, said first arm member being flexible in response to compressive loads;
   a scraping member having a first surface defining a scraping edge, said scraping member being attached to said second end of said first arm member and spaced apart from said first end of said first arm member so as to allow resilient movement of said scraping member toward said first end of said first arm member;
   a second resilient arm member having a first end and a second end, said second end of said second arm member being selectively attached to said scraping member, said scraping member being spaced apart from said first end of said second arm member so as to allow resilient movement of said scraping member toward said first end of said second arm member; and
   first attachment means for selectively attaching said second end of said second arm member to said scraping member;

whereby said second arm member is selectively removable from and attachable to said scraping member and said scraper blade is resiliently mounted for movement in response to belt reversal or compressive loads.

2. The conveyor belt scraper of claim 1 wherein said first attachment means comprises a first channel formed in said scraping member and a first mounting flange formed on said second end of said second arm member, said first mounting flange adapted to be removably retained in said first channel.

3. The conveyor belt scraper of claim 2 wherein said first channel is generally T-shaped, and said first mounting flange is generally T-shaped and generally conforms to said T-shape of said first channel such that said first mounting flange is selectively slidable within said first channel.

4. The conveyor belt scraper of claim 2 including a mounting base and second attachment means for selectively attaching said second arm member to said mounting base.

5. The conveyor belt scraper of claim 4 wherein said second attachment means comprises a second channel formed in said mounting base and a second mounting flange formed on said first end of said second arm member, said second mounting flange adapted to be removably retained in said second channel.

6. The conveyor belt scraper of claim 5 wherein said first channel is generally T-shaped and said first mounting flange is generally T-shaped, said T-shaped first mounting flange generally conforming to said T-shape of said first channel such that said first mounting flange is selectively slidable within said first channel, and wherein said second channel is generally T-shaped and said second mounting flange is generally T-shaped, said T-shaped second mounting flange generally conforming to said T-shape of said second channel such that said second mounting flange is selectively slidable within said second channel.

7. The conveyor belt scraper of claim 5 wherein said first mounting flange has a first cross-sectional configuration and said second mounting flange has a second cross-sectional configuration, said first and second cross-sectional configurations being substantially identical to one another such that said first mounting flange may be operably inserted into one of said first channel or said second channel as desired.

8. The conveyor belt scraper of claim 5 wherein said first channel is substantially parallel to said second channel.

9. The conveyor belt scraper of claim 5 including a third attachment means for selectively attaching said first end of said first arm member to said mounting base.

10. The conveyor belt scraper of claim 9 wherein said third attachment means comprises a third channel formed in said mounting base and a third mounting flange formed on said first end of said first arm member, said third mounting flange adapted to be removably retained in said third channel.

11. The conveyor belt scraper of claim 1 wherein said second arm member includes a nonplanar segment located between said first and second ends of said second arm member.

12. The conveyor belt scraper of claim 11 wherein said nonplanar segment is nonlinear between said first end and said second end of said second arm member.

13. The conveyor belt scraper of claim 1 wherein said second end of said first arm is integrally attached to said scraping member.

14. The conveyor belt scraper of claim 1 wherein said first arm member is formed with a material having a first durometer of hardness and said second arm member is formed with a material having a second durometer of hardness, said first durometer of hardness being higher than said second durometer of hardness.

15. The conveyor belt scraper of claim 1 wherein said first arm member is formed with an elastomeric material having a durometer of at least approximately 95 Shore A and said second arm member is formed with an elastomeric material having a durometer that is lower than approximately 95 Shore A.

16. The conveyor belt scraper of claim 1 wherein said scraping member includes a second surface extending from said scraping edge, said first surface being disposed at an acute angle relative to said second surface at said scraping edge.

17. A conveyor belt scraper adapted for use in cleaning the surface of a conveyor belt, said scraper including:

a scraping member having a scraping surface defining a scraping edge;

a first resilient arm member having a first end and a second end, said second end being attached to said scraping member, said first arm member being formed with a resilient material having a first modulus of elasticity and being flexible in response to compressive loads; and a second resilient arm member having a first end and a second end, said second end being attached to said scraping member, said second arm member being formed with a resilient material having a second modulus of elasticity, said second modulus of elasticity being lower than said first modulus of elasticity, said second arm member being flexible in response to compressive loads.

18. The conveyor belt scraper of claim 17 wherein said first arm member is formed with an elastomeric material having a first durometer of hardness and said second arm member is formed with an elastomeric material having a second durometer of hardness, said second durometer of hardness being lower than said first durometer of hardness.

19. The conveyor belt scraper of claim 17 wherein said first arm member is formed with an elastomeric material having a durometer of at least approximately 95 Shore A and said second arm member is formed with an elastomeric material having a durometer lower than approximately 95 Shore A.

20. The conveyor belt scraper of claim 17 including a mounting base, said first end of said first arm member being attached to said mounting base and said first end of said second arm member being attached to said mounting base.

21. A support arm member for use in combination with a conveyor belt scraper having a scraping member connected to a mounting base by a restraining arm member, said support arm member including:

a resiliently flexible and collapsible link member extending between a first end and a second end;

first attachment means at said first end of said link member for selectively attaching said first end of said link member to the mounting base; and second attachment means at said second end of said link member for selectively attaching said second end of said link member to the scraping member;

whereby said support arm member is adapted to connect the scraping member to the mounting base in conjunction with the restraining arm member.

22. The support arm member of claim 21 wherein said first attachment means comprises a generally T-shaped mounting member.

23. The support arm member of claim 22 wherein said second attachment means comprises a generally T-shaped mounting member.

24. The support arm member of claim 21 wherein said link member includes a generally nonplanar segment located between said first end and said second end of said link member.

25. A scraping head for use with a conveyor belt scraper including a mounting base having a first mounting member and a resiliently flexible and collapsible first arm member having a first end and a second end, the first end of the first arm member being connected to the mounting base, the second end of the first arm member including a second mounting member, said scraping head including:

a scraping member having a first surface defining a scraping edge and a first attachment means for selectively attaching the second mounting member of the first arm member to said scraping member; and a second attachment means attached to said scraping member for selectively attaching the first mounting member of the mounting base to said scraping member.

26. The scraping head of claim 25 including a second arm member having a first end and a second end, said first end of said second arm member including said second attachment means, said second end of said second arm member being attached to said scraping member.

27. The scraping head of claim 26 wherein said first attachment means comprises a channel formed in said scraping member adapted to receive the second mounting member of the first arm member.

28. The scraping head of claim 25 wherein said second attachment means comprises a mounting flange attached to said scraping member, said mounting flange adapted to be attached to the first mounting member of the mounting base.

29. The scraping head of claim 25 wherein said second attachment means comprises a second arm member having a first end and a second end, said first end including a mounting member for attaching said second arm member to the first mounting member of the mounting base and said second end of said second arm member being attached to said scraping member.

30. The scraping head of claim 25 wherein said scraping member includes a second surface, said first surface forming an acute angle with said second surface at said scraping edge.

31. A conveyor belt scraper adapted for use in cleaning the surface of a conveyor belt, said scraper including:

a scraping member having a first surface defining a scraping edge;

a collapsible support member having a first end and a second end, said second end of said support member being attached to said scraping member, said support member being resiliently and flexibly collapsible from a first position toward a second position in response to a scraping force of operational magnitude applied to said scraping edge, said support member being located in said first position when said scraping force is zero wherein said first end and said second end of said support member are spaced apart from one another a first linear distance, said support member being movable toward said second position when said scraping force is applied to said scraping edge wherein said first end and said second end of said support member are spaced apart from one another a second linear distance, said second linear distance being shorter than said first linear distance; and a restraining member having a first end and a second end, said second end of said restraining member being attached to said scraping member, said restraining member being substantially inelastic such that said restraining member substantially resists physical elongation between said first and second ends of said restraining member during flexible collapse of said support member from said first position toward said second position.

32. The conveyor belt scraper of claim 31 wherein said support member is substantially nonlinear between said first end and said second end of said support member.

33. The conveyor belt scraper of claim 31 wherein said support member includes a link member located between said first end and said second end of said support member.

34. The conveyor belt scraper of claim 33 wherein said link member comprises a resilient spring member.

35. The conveyor belt scraper of claim 34 wherein said spring member comprises a coil spring.

36. The conveyor belt scraper of claim 34 wherein said spring member is formed from an elastomeric material.

37. The conveyor belt scraper of claim 34 wherein said spring member is formed from a metallic material.

38. The conveyor belt scraper of claim 33 wherein said link member comprises a web.

39. The conveyor belt scraper of claim 33 wherein said web includes a curved segment.

40. The conveyor belt scraper of claim 31 wherein said restraining member includes a link member located between said first and second ends of said restraining member, said link member being resiliently collapsible.

41. The conveyor belt scraper of claim 31 wherein said second end of said restraining member is attached to said first surface of said scraping member.

42. The conveyor belt scraper of claim 31 including a plurality of support members attached to said scraping member.

43. The conveyor belt scraper of claim 31 including a plurality of restraining members attached to said scraping member.

44. The conveyor belt scraper of claim 31 wherein said scraping member includes a second surface extending from said scraping edge, said first surface being disposed at an acute angle relative to said second surface at said scraping edge.

* * * * *